UNITED STATES PATENT OFFICE.

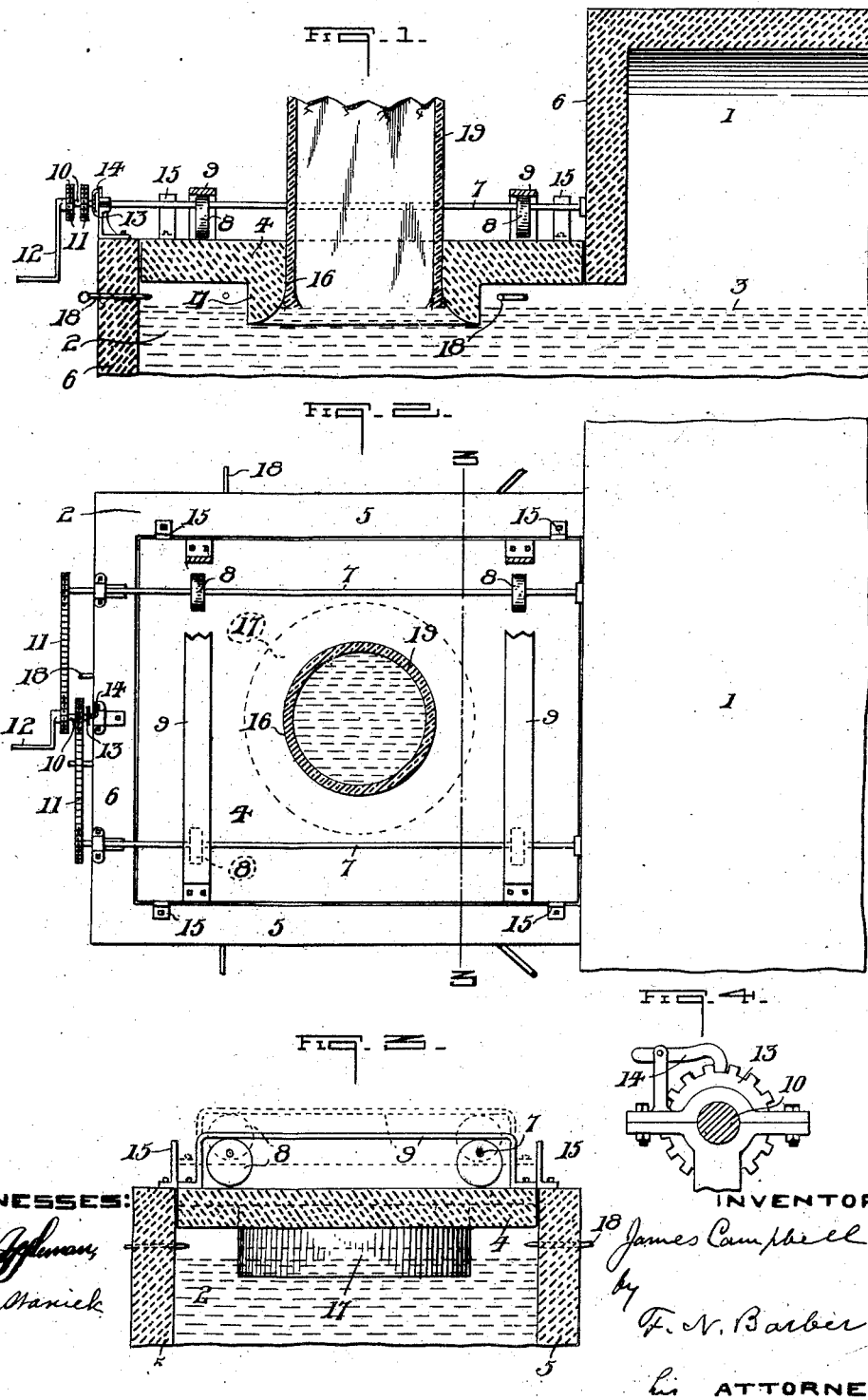

JAMES CAMPBELL, OF PITTSBURG, PENNSYLVANIA.

GLASS-MAKING APPARATUS.

No. 902,207.　　　Specification of Letters Patent.　　　Patented Oct. 27, 1908.

Application filed October 25, 1907. Serial No. 399,143.

*To all whom it may concern:*

Be it known that I, JAMES CAMPBELL, a citizen of the United States, residing at Pittsburg, in the county of Allegheny and State of Pennsylvania, have invented or discovered new and useful Improvements in Glass-Making Apparatus, of which the following is a specification.

My invention relates to apparatus for drawing glass, and its object is to improve tank furnaces whereby glass may be drawn therefrom without exposing the drawn glass to the cutting action of the burners during the drawing operation and whereby the drawn glass may be readily severed by the burners at the close of the drawing operation.

My invention particularly relates to what I term the roof or top-stone, with which I combine a shield to protect the glass at the drawing zone.

Referring to the drawings, Figure 1 is a central vertical section of a furnace embodying my invention; Fig. 2, a plan thereof; Fig. 3, a section on the line 3—3 on Fig. 2; and Fig. 4, a detail of the ratchet mechanism for supporting the roof or top-stone.

Referring to the drawings, 1 represents a glass tank of any desired construction having the forehearth 2, into which the molten glass runs from the tank as the drawing of glass articles proceeds. The level of the molten glass is shown by the broken line 3.

The entire top-stone or roof 4 of the forehearth is made to move vertically between the side walls 5 and the end walls 6.

Supported by the walls 5 are the two shafts 7 carrying near each end a cam 8, on which rest the bars 9 secured to the roof or top-stone 4.

A shaft 10 is provided on the front wall 6 which is geared to the shafts 7 by the sprocket chains 11, the shaft 10 having the operating handle 12. The shaft 10 also carries the ratchet wheel 13, which may be locked in any desired position by pawl 14.

The top-stone or roof 4 is guided vertically by the vertical posts 15 seated on the walls of the forehearth 2.

The roof or top-stone has the central vertical hole 16 which extends entirely through the same, the lower portion of the hole preferably flaring downwardly as shown in Fig. 1. The roof or top stone is thinner radially outward a short distance from the opening 16, whereby the roof or top-stone has the depending circular flange or shield 17 about the lower half of the opening 16.

A number of gas burners 18 are arranged in the walls of the forehearth so as to project their flames into the space between the glass line 3 and the roof or top-stone 4.

19 represents a glass cylinder being drawn from the opening 16, the mechanism for lifting the cylinder being omitted.

The glass in the tank and forehearth being at the proper temperature for drawing, the handle 12 is rotated so as to lower the shield 17 into the glass a sufficient distance to cut off the flames of the burners from the opening 16 in the roof or top-stone. The cylinder 19 is then drawn through the opening 16 in the well known manner, the burners in the meantime keeping the glass around the flange in the proper condition for drawing. As soon as the drawing is completed, the handle 12 is rotated in the opposite direction, so as to raise the shield 17 out of the glass, thus permitting the flames from the burners to cut off the cylinder at the glass line. This position of the shield and related parts is shown in dotted lines on Fig. 3. The cylinder 19 is then removed from the furnace and the opening 16 covered and the burners allowed to remelt the glass cut off from the cylinder and the glass adhering to the walls of the opening 16. By reason of the flare in the bottom of the opening the heat will be enabled to attack the glass in the opening better than if the walls of the opening were vertical. When the glass is ready for another drawing, the roof or top-stone is again lowered and the operation described is repeated.

By making the whole top of the forehearth movable vertically, I preserve an absolutely perfect seal against the flame attacking the cylinder above the top-stone. Furthermore in case repairs are needed in the forehearth, it is but the matter of a few minutes to attach a hoisting mechanism to the roof or top-stone and take it entirely out of the way, thus giving full access to the interior of the furnace. In case the flames shall emerge at the edges of the roof or top-stone, no damage will be done to the cylinder as the distance therefrom is too great.

By the use of the word top-stone, I do not confine myself to the use of stone or any particular material or to any integral structure thereof. Other means for raising and lowering the roof or top-stone may be used.

I claim—

1. In a glass drawing furnace, a vertically movable roof therefor, having therein a drawing opening, a shield projecting from the lower face of said roof, having movement with the said roof, and forming the lower part of said opening, means to raise and lower the roof so that the flange may project into the glass during the drawing operation and be raised out of the glass after the same, and burners arranged to project their flames into the space between the top-stone and the glass line.

2. In a glass drawing furnace, a glass melting tank, a forehearth connected thereto, a vertically movable roof for the latter, having a drawing opening therein, a shield projecting from the bottom of the roof, having movement with the said roof, and forming the lower part of said opening, means to raise and lower said roof, and burners arranged to project their flames into the space between the roof and the glass line.

Signed at Pittsburg, Pa., this 18th day of October, A. D. 1907.

JAMES CAMPBELL.

Witnesses:
F. N. BARBER,
ANNA R. BEATTY.